United States Patent
Kabaria et al.

(10) Patent No.: US 11,663,840 B2
(45) Date of Patent: May 30, 2023

(54) METHOD AND SYSTEM FOR REMOVING NOISE IN DOCUMENTS FOR IMAGE PROCESSING

(71) Applicant: Bloomberg Finance L.P., New York, NY (US)

(72) Inventors: Kevin Ramesh Kabaria, Richlands, VA (US); Hitesh Jain, Short Hills, NJ (US)

(73) Assignee: Bloomberg Finance L.P., New York, NY (US)

( * ) Notice: Subject to any disclaimer, the term of this patent is extended or adjusted under 35 U.S.C. 154(b) by 300 days.

(21) Appl. No.: 16/830,827

(22) Filed: Mar. 26, 2020

(65) Prior Publication Data
US 2021/0304364 A1 Sep. 30, 2021

(51) Int. Cl.
*G06V 30/40* (2022.01)
*G06T 5/00* (2006.01)
(Continued)

(52) U.S. Cl.
CPC ............. *G06V 30/40* (2022.01); *G06N 3/045* (2023.01); *G06N 3/084* (2013.01); *G06T 5/002* (2013.01);
(Continued)

(58) Field of Classification Search
CPC ......... G06T 5/002; G06T 5/50; G06T 7/0002; G06T 2207/20081; G06T 2207/20084;
(Continued)

(56) References Cited

U.S. PATENT DOCUMENTS 10,511,908 B1 * 12/2019 Fisher ...................... G06N 3/08
11,176,443 B1 * 11/2021 Selva ................... G06V 30/414
(Continued)

OTHER PUBLICATIONS

Su, X., et al., "An End-to-End Preprocessor Based on Adversiarial Learning for Mongolian Historical Document OCR", In book: PRICAI 2019: Trends in Artificial Intelligence, 16th Pacific Rim Intel Conference on Artificial Intelligence, Cuvu, Yanuca Island, Fiji, Aug. 26-30, 2019, Proceedings, Part III, pp. 266-272.*

*Primary Examiner* — Xuemei G Chen
(74) *Attorney, Agent, or Firm* — Chiesa, Shahinian & Giantomasi PC

(57) ABSTRACT

A method and system are provided for removing noise from document images using a neural network-based machine learning model. A dataset of original document images is used as an input source of images. Random noise is added to the original document images to generate noisy images, which are provided to a neural network-based denoising system that generates denoised images. Denoised images and original document images are evaluated by a neural network-based discriminator system, which generates a predictive output relating to authenticity of evaluated denoised images. Feedback is provided backpropagation updates to train both the denoising and discriminator systems. Training sequences are iteratively performed to provide the backpropagation updates, such that the denoising system is trained to generate denoised images that can pass as original document images while the discriminator system is trained to improve the accuracy in predicting the authenticity of the images presented.

20 Claims, 14 Drawing Sheets

(51) Int. Cl.
- *G06T 5/50* (2006.01)
- *G06T 7/00* (2017.01)
- *G06N 3/084* (2023.01)
- *G06N 3/045* (2023.01)
- *G06V 30/164* (2022.01)
- *G06V 30/19* (2022.01)
- *G06V 10/82* (2022.01)
- *G06V 30/10* (2022.01)

(52) U.S. Cl.
CPC ............. *G06T 5/50* (2013.01); *G06T 7/0002* (2013.01); *G06V 10/82* (2022.01); *G06V 30/164* (2022.01); *G06V 30/19173* (2022.01); *G06T 2207/20081* (2013.01); *G06T 2207/20084* (2013.01); *G06T 2207/20182* (2013.01); *G06T 2207/30168* (2013.01); *G06T 2207/30176* (2013.01); *G06V 30/10* (2022.01)

(58) Field of Classification Search
CPC . G06T 2207/20182; G06T 2207/30168; G06T 2207/30176; G06N 3/0454; G06N 3/084; G06N 3/0472; G06V 10/82; G06V 30/164; G06V 30/10; G06V 30/40; G06K 9/6271

See application file for complete search history.

(56) References Cited

U.S. PATENT DOCUMENTS

| | | | |
|---|---|---|---|
| 2018/0293713 A1* | 10/2018 | Vogels | G06N 3/045 |
| 2019/0012581 A1* | 1/2019 | Honkala | G06N 3/048 |
| 2019/0057521 A1* | 2/2019 | Teixeira | A61B 90/361 |
| 2019/0214135 A1* | 7/2019 | Wu | G16H 30/40 |
| 2019/0325887 A1* | 10/2019 | Karkkainen | G10K 11/17827 |
| 2020/0082508 A1* | 3/2020 | Alletto | G06T 5/002 |
| 2020/0118306 A1* | 4/2020 | Ye | G06T 5/002 |
| 2020/0160113 A1* | 5/2020 | Zhang | G06F 18/2148 |
| 2020/0169785 A1* | 5/2020 | Goodsitt | H04N 21/812 |
| 2020/0279134 A1* | 9/2020 | Bousmalis | B25J 9/1605 |
| 2020/0294201 A1* | 9/2020 | Planche | G06F 30/27 |
| 2021/0117733 A1* | 4/2021 | Mahto | G06K 9/6265 |
| 2021/0239490 A1* | 8/2021 | Liu | G01C 21/3682 |
| 2021/0271968 A1* | 9/2021 | Ganin | G06N 3/08 |
| 2022/0027709 A1* | 1/2022 | Honkala | G06N 3/0472 |
| 2022/0101527 A1* | 3/2022 | Wang | G06V 10/32 |
| 2022/0343638 A1* | 10/2022 | Wang | G06F 18/00 |

\* cited by examiner

Cus The Service electronic
acsimile, e
and concli
icensee a

105

Amendment (the "Amendment") to th
BANK OF CO!
terms used herein but not otherwise

110

Before Training

After Training

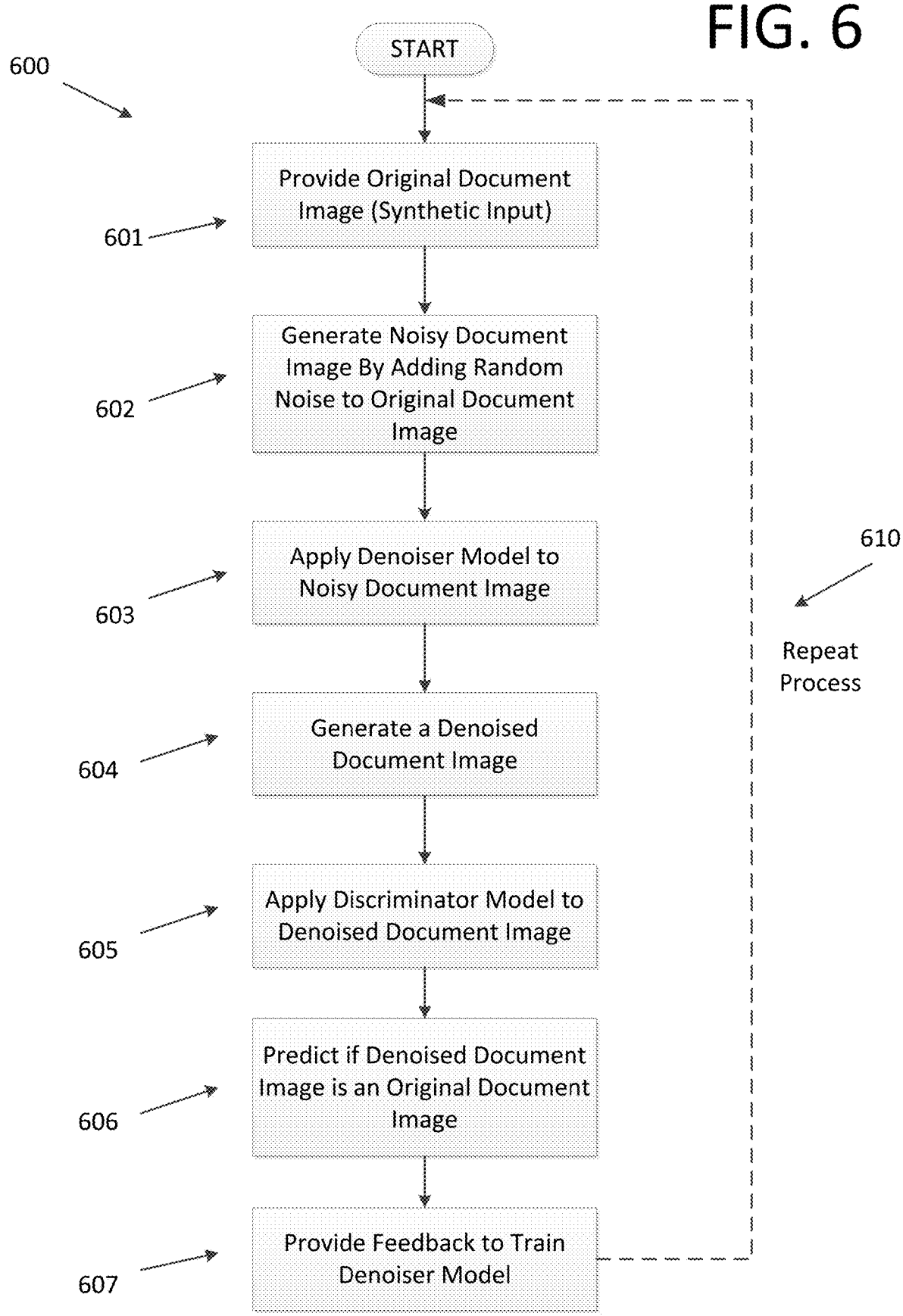

METHOD AND SYSTEM FOR REMOVING NOISE IN DOCUMENTS FOR IMAGE PROCESSING

TECHNICAL FIELD

The present invention relates generally to document management solutions, and more specifically to a machine learning-based method and system for removing noise from documents for image processing.

BACKGROUND

Document management processes often require converting documents into editable, readable and searchable digital formats. Such documents may be in various forms and formats and of varying degrees of quality, including scanned document image files in non-searchable/non-editable document image formats as one example. Document management processes and tasks can become particularly onerous when dealing with a large repository of previously scanned documents. For example, the underlying text from the scanned documents must be accurately extracted from the large volume of documents for indexing, cataloguing, searching, editing and other forms of document processing.

Scanning is commonly used for capturing document images, i.e. converting a paper document into a digital image/format. The captured document is then processed through an optical character recognition (OCR) system to extract text from the document. The extracted text can then be used to store the document in an editable, readable and/or searchable format, which can enable, for example, keyword-based retrieval across a large collection of digitized documents, such as a company's library of contractual agreements.

One complicating factor in such scenarios is document noise. In particular, the accuracy of OCR scanning is greatly affected by noise in the documents being scanned. Such documents may have been already scanned for storage and likely will contain noise that may have existed before scanning or generated as a result of scanning, e.g., depending on the quality of the underlying document that was scanned, document-specific characteristics (e.g., handwritten annotations, etc.), quality of the scanning technology, and so on. Noise in scanned images and documents may also take on many forms, e.g., salt and pepper noise (black and white spots), clutter noise (from skew, document features, etc.), marginal noise, stroke-like pattern noise, and other forms. Generally, OCR scanning will produce poor results when the input is a noisy document image.

Removing noise from an image (also referred to as denoising) is therefore an important pre-processing step when scanning documents to extract underlying text with a higher degree of quality and accuracy. Existing noise removal algorithms and techniques for denoising document images can be computationally intensive and many have shortcomings in terms of quality and accuracy. Filter-based denoising is commonly used to improve the resolution of picture images, but such techniques are typically not well-suited for document images with underlying text to be scanned and extracted. Another approach is to employ scoring algorithms for obtaining a good match based on scores. However, scoring-based denoising is also not particularly effective for denoising text-based documents. Typically, these techniques are focused on making an image look better, but are not well suited for denoising text-based document images for subsequent processing in document management applications.

SUMMARY

These and other issues are addressed in a method and system for efficiently and effectively removing noise from document images using a neural network-based machine learning model. The claimed embodiments provide a generic denoising solution for improving image quality, which can be used as a pre-processing element for various applications, e.g., to provide cleaner denoised images for use in OCR applications and the like.

According to an embodiment, a method for removing noise from document images includes receiving one or more document images. Random noise is added to the one or more document images to generate one or more noisy images. Noise is removed from the one or more noisy images via a first neural network-based denoising system, which generates one or more denoised images. The one or more denoised images are evaluated via a second neural network-based discriminator system, which generates a predictive output relating to authenticity of the one or more denoised images. Feedback is provided via a first backpropagation update to train the first neural network-based denoising system.

According to some embodiments, the one or more document images are also evaluated via the second neural network-based discriminator system and feedback is provided via a second backpropagation update to train the second neural network-based discriminator system. In another embodiment, the second neural network-based discriminator system is in a trained state and the denoised images are evaluated via the second neural network-based discriminator system to provide feedback via a third backpropagation update to train the second neural network-based discriminator system. According to an embodiment, a plurality of training sequences are iteratively performed to provide the respective first, second and third backpropagation updates and to further facilitate learning, by the second neural network-based discriminator system, of underlying patterns of noise in the one or more noisy images. In various embodiments, the predictive output relating to authenticity is an indicator of whether the evaluated one or more denoised images is determined as being a synthetically-generated document image corresponding to the one or more noisy images or an original document image corresponding to the one or more document images.

In some embodiments, the second neural network-based discriminator system receives an equal number of the one or more denoised images and the one or more document images, which are provided to the second neural network-based discriminator system on an unpaired basis at different times. In another embodiment, the first neural network-based denoising system and second neural network-based discriminator system are trained to reach an equilibrium state, whereby the denoising system generates denoised output images such that the predictive output from the discriminator system is indicative that the denoised output images are not distinguishable from the original document images in the synthetic dataset.

Another embodiment includes a system for removing noise from document images in accordance with the method described above.

These and additional features provided by the embodiments described herein will be more fully understood in view of the following detailed description, in conjunction with the drawings.

BRIEF DESCRIPTION OF THE DRAWINGS

FIG. 1 is an exemplary image of a document affected by various forms of noise.

FIG. 6 is a flowchart for a machine learning process for training a denoising system in accordance with one or more embodiments.

DETAILED DESCRIPTION

Figure 2:
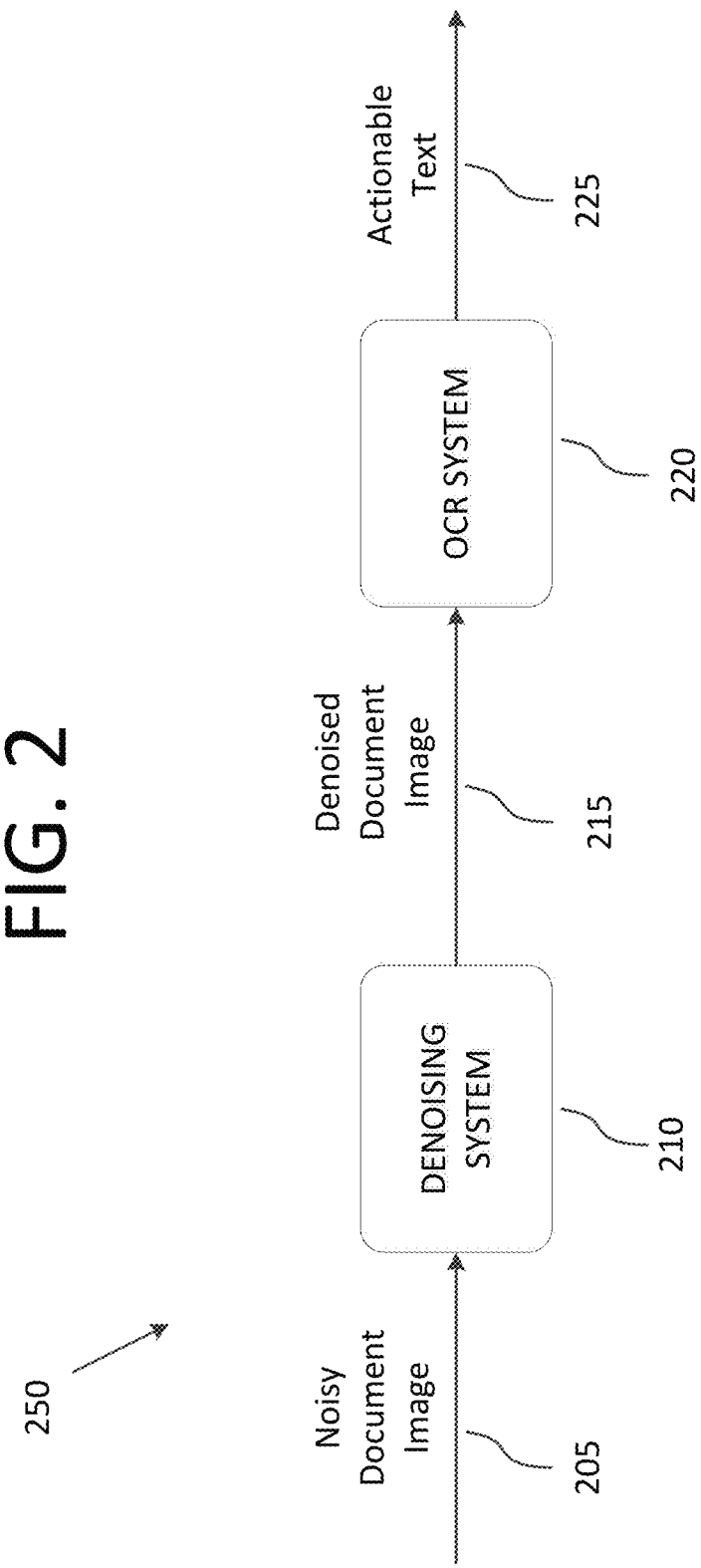
FIG. 2 is a block diagram illustrating a denoising system as a pre-processing element for document scanning in accordance with one or more embodiments.

Various illustrative embodiments will now be described more fully with reference to the accompanying drawings in which some of the illustrative embodiments are shown. It should be understood, however, that there is no intent to limit illustrative embodiments to the particular forms disclosed, either in the drawings or in the rest of this disclosure, but on the contrary, illustrative embodiments are intended to cover all modifications, equivalents, and alternatives falling within the scope of the claims. Where appropriate, like numbers refer to like elements throughout the description of the figures. It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of illustrative embodiments. As used herein, the term and/or includes any and all combinations of one or more of the associated listed items.

As one example of noise in a document, FIG. 1 shows an exemplary document image 100 illustrating various forms of noise. As shown, noise components 105 are an example of salt and pepper noise, which may take the form of randomly scattered black and/or white pixels in an image. Another example of noise is shown by noise component 110, which may have been caused by possible skewing errors resulting in overlap (and obstruction) between scanned text lines. As shown, document image 100 also contains other anomalies such as thicker and/or thinner characters and blobs, all of which contribute to the noise in document image 100. All such illustrated forms of noises (as well as others not shown) may affect OCR scanning of document image 100, e.g., causing scanning errors such as unrecognized or missing text depending on the location and severity of the various noise components. Such noise must be removed in order to maintain/restore visual acuity for OCR scanning.

According to various embodiments, a machine learning-based denoising system and method is provided for efficiently removing noise from document images to produce high quality, accurate and clean document images for subsequent processing, e.g., for OCR and other processing applications. FIG. 2 is a simplified block diagram illustrating a system that includes a denoising system as a pre-processing element for document scanning according to an embodiment. In particular, system 250 includes denoising system 210 which receives a noisy document image as input 205 and generates a denoised document image as output 215. Output 215 then be used as input for an OCR system 220, in this simplified example. In this manner, denoising system 210 serves as a pre-processing technique to facilitate subsequent processing, in this case by OCR system 220. Because of the accuracy and image quality from denoising system 210, OCR system 220 is able to generate actionable text as shown in output 225. As described and shown, system 250 is a simplified example for illustrative purposes and is not intended to be limiting in any manner.

According to one or more embodiments, the machine learning-based denoising system and method incorporates a training methodology based on a neural network-based model. For example, the training methodology modifies and applies concepts from a generative adversarial network (GAN) model approach in which two neural networks effectively compete with each other through training sequences. With this approach, a generic denoising solution for improving image quality can be used as a pre-processing element for various image processing functions, e.g., to provide clean images for use in OCR applications, regardless of the particular OCR tool or platform being used, many of which are typically third-party off-the-shelf applications.

Among various features and characteristics, the machine learning-based denoising system and method according to various embodiments is realized in an unconstrained machine learning model that learns underlying aggregate patterns using synthetic training data. Accuracy of the denoising model improves over time in an effective and efficient manner.

A denoising system according to one or more embodiments applies the concept of generator and discriminator functions from the GAN-based neural network model. For example, a first neural network model is used as a denoiser to carry out the generator function. More specifically, the denoiser receives noisy images (e.g., clean original images from a synthetic dataset that have noise randomly added)

and generates denoised output images. A second neural network model used as a discriminator is given both original images and denoised images (e.g., noisy versions of the original images that have been passed through the denoiser) to predict whether the received images are an original image or not. For example, the discriminator may output a probability that a given image is an original image. In some embodiments, the discriminator may be given equal quantities of original and denoised images, but the images are not necessarily paired and provided to the discriminator at the same time, e.g., the discriminator is not given both an original image and its corresponding noisy version that has been denoised image at the same time. In this manner, the training model is not constrained.

According to the principles of operation, the discriminator eventually learns what makes an image original or unoriginal. The differentiating factor is, in the aggregate, noise, so the discriminator learns to identify noise in the image through the training sequences. Initially, both models, the denoiser and discriminator (sometimes referenced as the detective) are untrained. For example, the discriminator does not initially understand what comprises original images. Over time, the discriminator learns what features are in an original image and that knowledge is backpropagated to the denoiser. The denoiser adapts (is trained) from the feedback given by the discriminator and evolves to the point of being able to create denoised images that closely resemble clean original images. Eventually, both models reach an equilibrium where the denoiser will be producing images that the discriminator is unable to distinguish from original images. A denoiser trained in this manner can then be placed into operation as a pre-processing element to feed an image processing application, e.g., an OCR application that will then produce accurate and highly reliable results.

Figure 3:
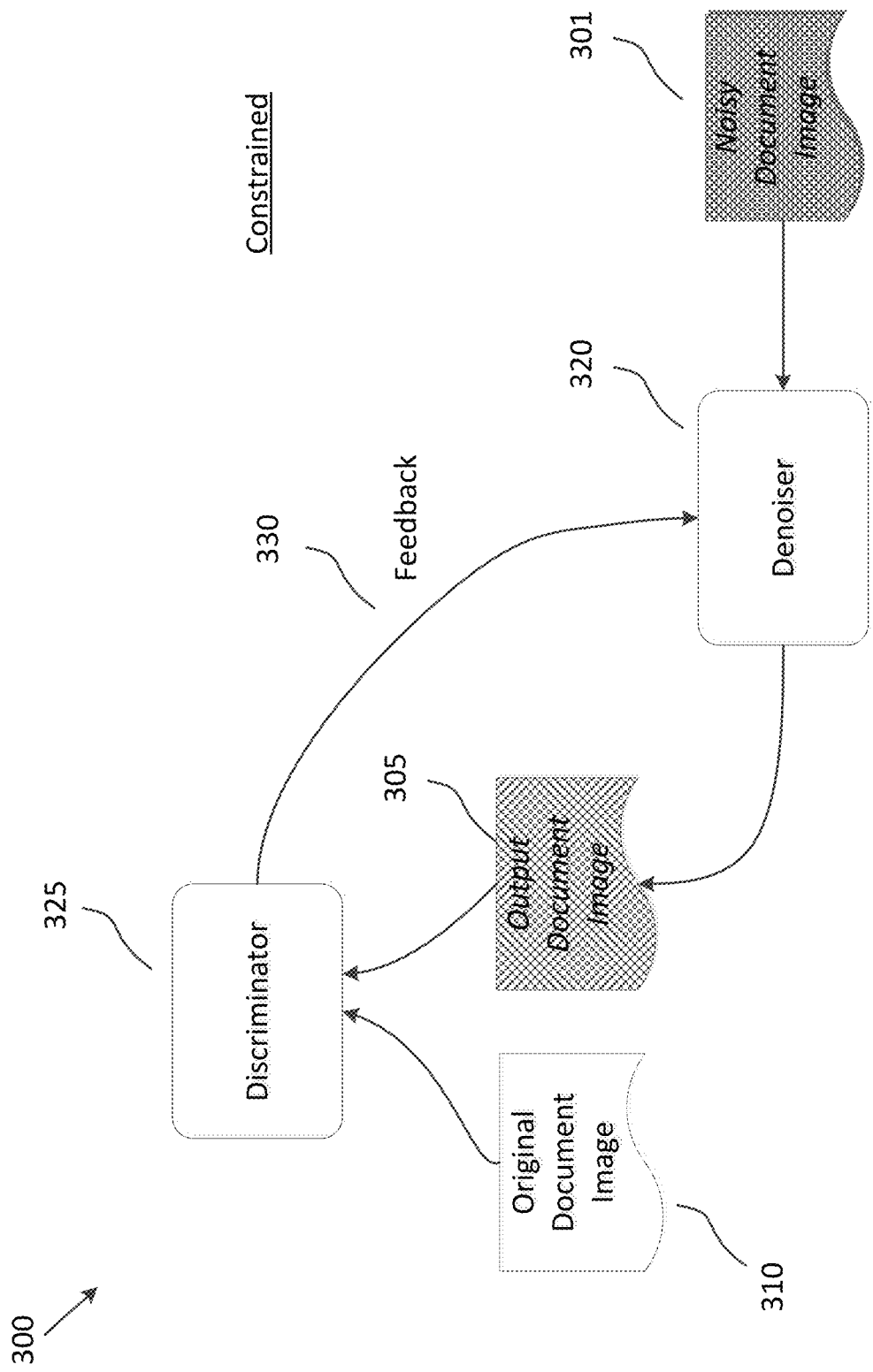
FIG. 3 shows an illustrative machine learning workflow for training a denoising system.

FIG. 3 shows an exemplary configuration for a machine learning workflow 300 in which a denoiser 320 and a discriminator 325 are each implemented as machine learning models. As shown, a noisy document image 301 is provided as an input to denoiser 320, which generates a denoised output document image 305. Denoised output document image 305 along with an original document image 310 are provided to discriminator 325 for inspection. In particular, discriminator 325 compares denoised output document image 305 and original document image 310 in parallel and determines (e.g., predicts) authenticity, e.g., which one is the original image. Feedback 330 is then provided from the discriminator 325 to denoiser 320 to facilitate learning by denoiser 320. Workflow 300 illustrates the principles of operation for a constrained and supervised mode of operation, e.g., direct comparisons of both document images at the same time. In this mode (e.g., comparing A to A'), the discriminator 325 will only become efficient at recognizing and distinguishing between features in the paired document images.

Figure 4:
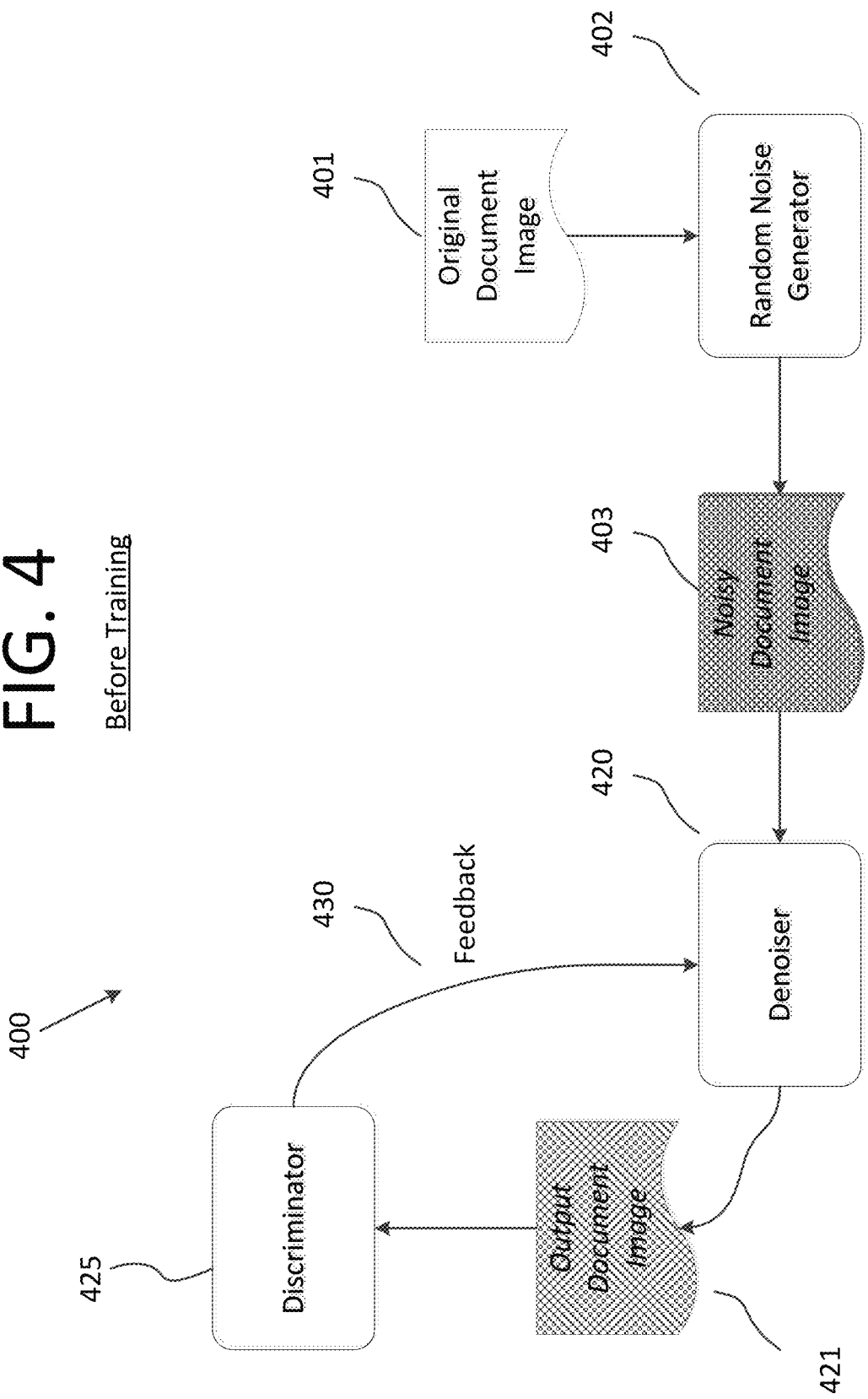
FIG. 4 is a block diagram that illustrates a machine learning workflow for training a denoising system in accordance with one or more embodiments.

FIG. 4 shows an exemplary configuration for a machine learning workflow 400 according to an embodiment in which a denoiser 420 and a discriminator 425 are each implemented as machine learning models. In this example, workflow 400 represents an operation before any training is performed for denoiser 420 and discriminator 425. As shown, original document image 401 is provided as an input to a random noise generator 402 that adds one or more forms of document noise to generate noisy document image 403, which is then input to denoiser 420. Denoiser 420 generates denoised output document image 421, which is provided to discriminator 425 for inspection. In this workflow, discriminator 425 determines (e.g., predicts) the authenticity of output document image 421, e.g., predicts whether it is an original document image or not. In this example (e.g., before any training is performed on denoiser 420), output document image 421 contains enough noise (see shading) such that discriminator 425 determines/predicts that it is not an original document image. Feedback 430 is then provided from discriminator 425 to denoiser 420 to train denoiser 420.

According to an embodiment, the process continues iteratively, such that denoiser 420 learns to adapt and generate output document images 421 that more closely resemble original images (e.g., improves the denoising functionality), while discriminator 425 learns features of original and denoised document images (e.g., by learning aggregate underlying patterns that constitute noise and patterns that make a document image an original document image), thereby improving the predictive functionality. Accordingly, workflow 400 is meant to illustrate an unconstrained mode of operation because learning is not constrained to side-by-side comparative analysis, but instead is based on learning underlying patterns that can be more broadly adapted and applied.

Figure 5:
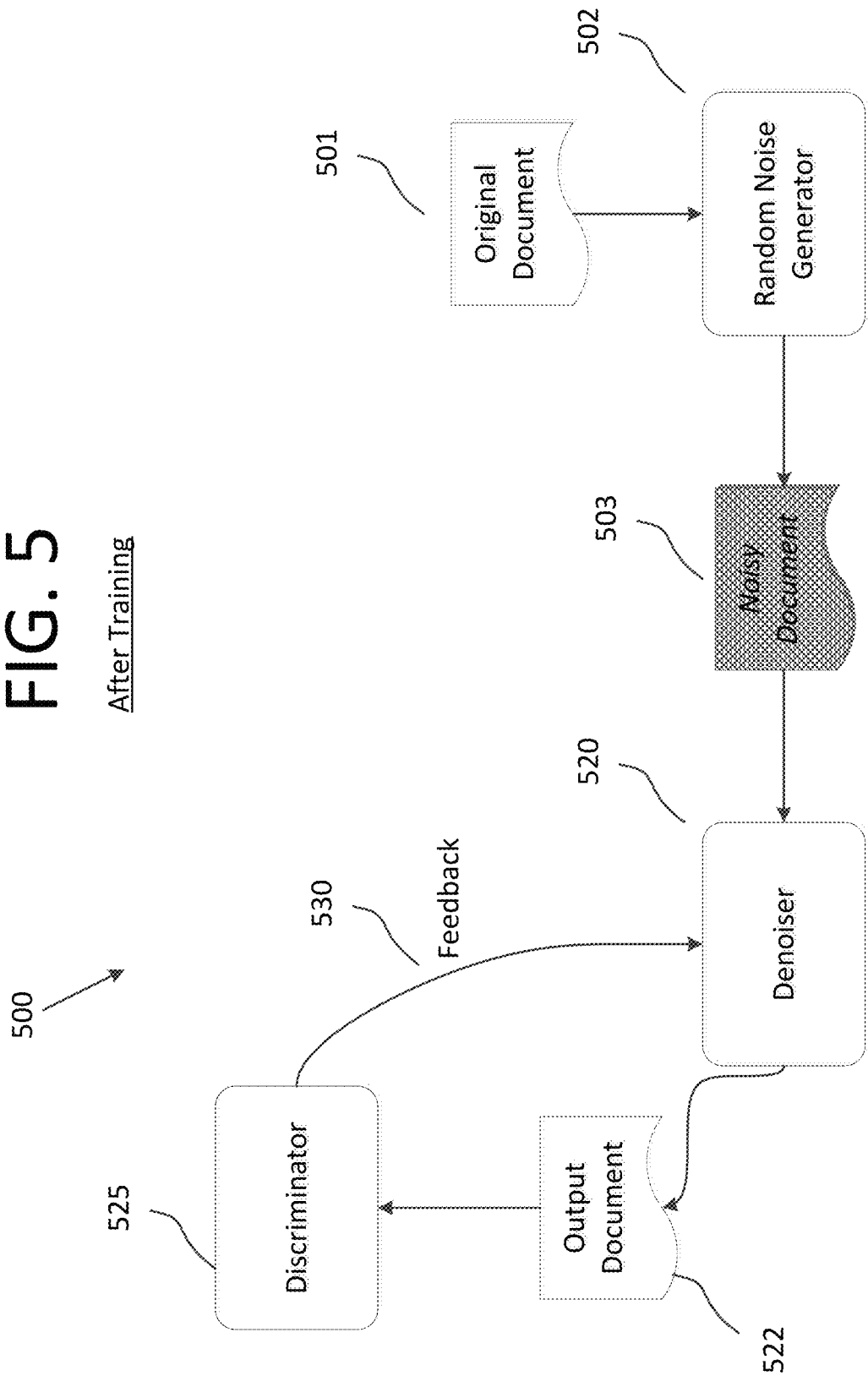
FIG. 5 is a block diagram that illustrates a machine learning workflow for training a denoising system in accordance with one or more embodiments.

FIG. 5 shows an exemplary configuration for a machine learning workflow 500 according to an embodiment similar to that shown above in FIG. 4, except that workflow 500 represents an operation after training has been performed for denoiser 520 and discriminator 525, e.g., through iterative training sequences following the workflow described in FIG. 4. As shown in FIG. 5, original document image 501 is provided as an input to a random noise generator 502 that adds one or more forms of document noise to generate noisy document image 503, which is then input to denoiser 520. Denoiser 520 generates denoised output document image 522, which is provided to discriminator 425 for inspection. Because discriminator 525 and denoiser 520 have been trained, output document image 522 has been denoised such that it more accurately resembles original document image 501. For example, the lack of shading in output document image 522 (as compared to output document image 421 in FIG. 4) is intended to represent less noise, for simplicity of illustration. In this workflow example, discriminator 525 therefore determines/predicts that output document image 522 is an original document image and feedback 530 is provided to denoiser 520.

According to the embodiments shown, training is focused on learning the noise in denoised images provided by a denoiser. That is, as a discriminator continues to learn the underlying patterns in document images that constitute noise (e.g., an aggregate number of underlying patterns (pixels) representing noise), feedback from the discriminator is used to train the denoiser to more efficiently and effectively remove such noise components from the source documents and generate denoised images that more closely resemble original images. The goal of a trained denoiser is therefore to generate denoised images that can pass as originals (e.g., enough noise has been removed to fool the discriminator).

According to an aspect of the various embodiments, the training model is based on the principle of differentiating and can be implemented in an unsupervised mode of operation, e.g., is document image original, yes or no? This is accomplished in various embodiments in an unconstrained mode of operation using a synthetic data set as the input source, e.g., original images that are then enhanced with noise and then denoised for subsequent inspection.

FIG. 6 shows a high-level flowchart for a machine learning process 600 for training a denoiser in accordance with one or more embodiments. In step 601, an original document image is provided as a synthetic input for the machine learning process. In step 602, random noise is added to the original document image from step 601 to generate a noisy document image. Random noise can be added via a random noise generator program, by way of example. In step 603, a denoiser is applied to the noisy document image, e.g., the noisy document image is provided as input to a neural network-based denoiser for processing. In step 604, the denoiser generates a denoised document image in which noise has been removed (to some degree) from the noisy document image. In step 605, a discriminator is applied to the denoised document image, e.g., the denoised document image is provided as input to a neural network-based discriminator for processing. In step 606, the discriminator predicts whether the denoised document image is an original document image or not, e.g., the prediction is therefore indicative of whether the discriminator can distinguish between an original document image and one that has been passed through the denoiser). In step 607, feedback is provided from the discriminator to the denoiser to train the denoiser. As indicated by callout 610, the training process is repeated, starting again with step 601. The training process can be repeated on an iterative basis, as indicated by callout 610, to further train the denoiser as described previously.

As described, various embodiments provide a novel training methodology based on a neural-network-based machine learning model for denoising documents. According to an embodiment, principles of a generative adversarial network (GAN) model can be applied in which two neural networks effectively compete with each other, one being a generative network and the second being a discriminative network. In the context of denoising document images according to embodiments described herein, the machine learning model includes a denoiser neural network model that serves the generative function and a discriminator neural network model that serves the discriminative function. A generator model is trained to generate or output new denoised images that can pass for original images while the discriminator model is trained to improve the accuracy in predicting the authenticity of the images presented.

A further modification to the GAN-based approach for the embodiments described herein involves the use of a synthetic training dataset of original images that are then noise-enhanced, denoised via the denoiser neural network, and then inspected by the discriminator neural network. This is in contrast to a conventional GAN-based approach in which fake images, which are generated by the generator network are presented to the discriminator network at the same time as original images to facilitate a parallel, side-by-side comparison for predicting authenticity between the two paired, presented images. In the embodiments described herein, the denoiser neural network model generates denoised versions of original images that are then passed to the discriminator neural network, which evaluates the generated images for authenticity, e.g., decide whether the images are original images or not. Again, one goal of this denoiser neural network model is therefore to generate denoised images that can pass as originals (e.g., fool the discriminator), while the objective of the discriminator is to identify images coming from the generator that are not originals.

According to an aspect of one or more of the various embodiments, the training dataset is fully synthetic. For example, original (clean) images can be generated by converting documents from word processing programs directly into images. As described, a programmatic random noise generator can then be used to apply different types of noise to the original images to create the noisy images used as input for the training models. The added noise can be varied, with probabilities defining the amount and type of noise to be added. By way of example and not limitation, convolutions can be used to apply black blob noise. Other noise that can be added may include salt and pepper (black/white Gaussian) noise or rotational transformations to the images. Again, these examples are meant to be illustrative only. According to an aspect of one or more various embodiments, the training dataset can also include images that are representative of what an ideal output would look like.

In operation, the desired state is for the denoiser to be trained such that it will be able to effectively remove noise with a high degree of precision from noisy images and generate output images with a high level of visual acuity. A trained denoiser can then be used in an operational context as a pre-processing element before OCR scanning operations on document images as one non-limiting example. As a result of a more accurate, pre-processing denoising system, subsequent OCR scanning of the denoised documents will produce higher quality output documents, which can then be used for carrying out a wide range of document management operations, e.g., indexing, searching, retrieving terms from within documents, and so on.

Figure 7A:
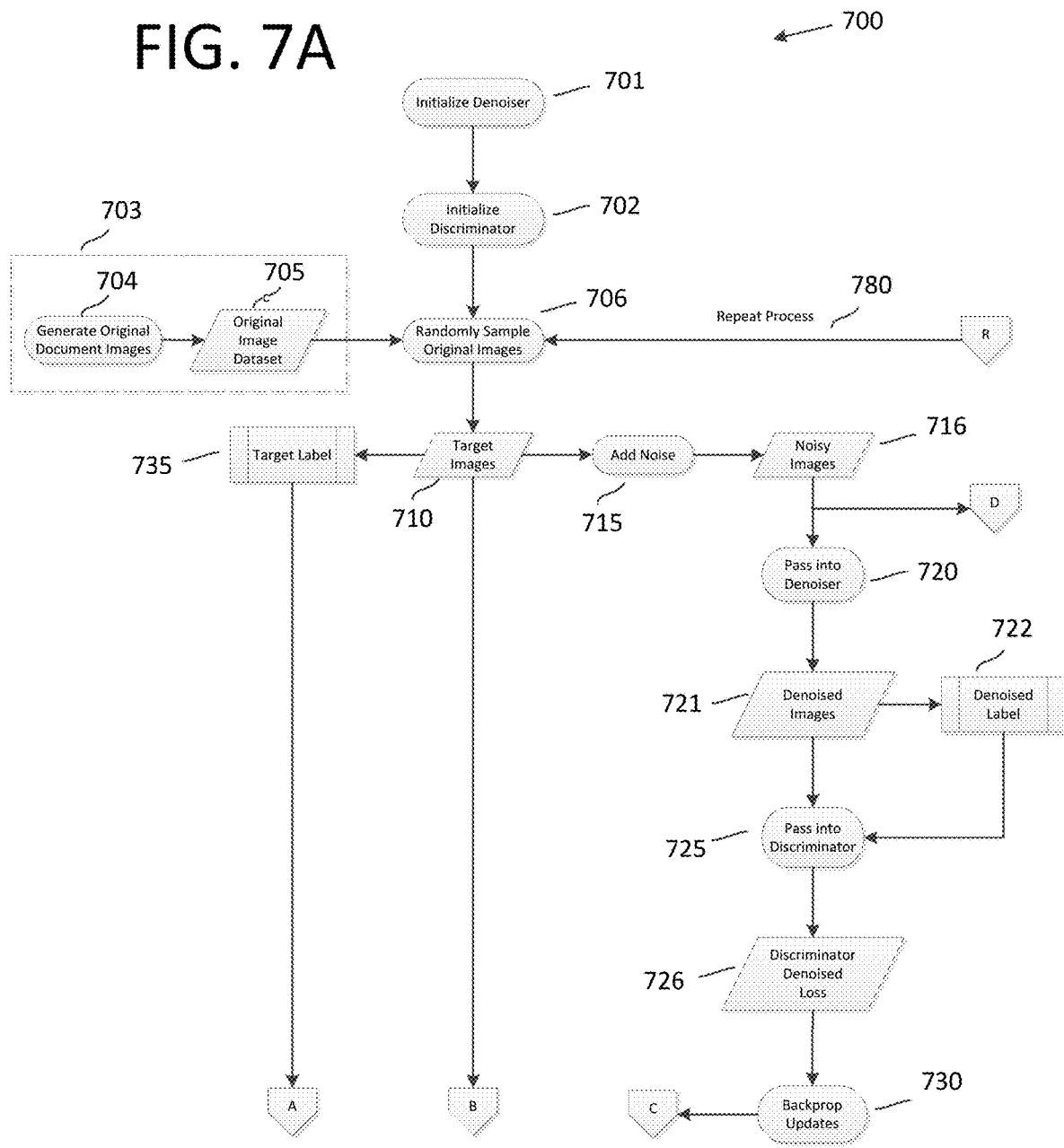
FIG. 7A and FIG. 7B are flowcharts for a neural network-based training model for a denoising system and a discriminator system in accordance with one or more embodiments.
Figure 7B:
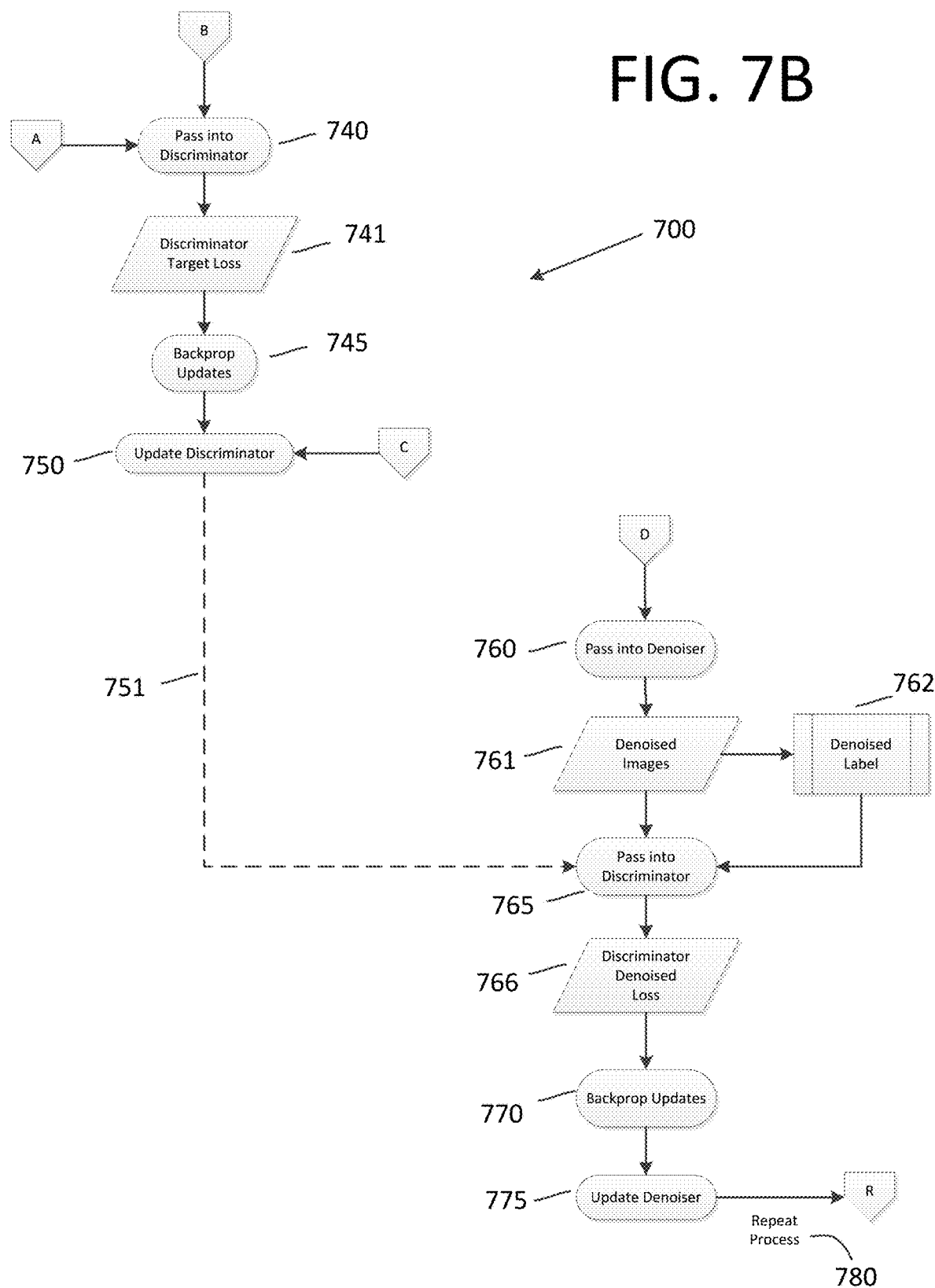

FIG. 7A and FIG. 7B are more detailed flowcharts illustrating a machine learning process 700 for training a neural network-based denoiser and a neural network-based discriminator in accordance with an embodiment.

As shown in FIG. 7A, process 700 starts at step 701 in which the denoiser element is initialized followed by step 702 in which the discriminator element is initialized. Dataset generation occurs in block 703 to generate images for subsequent training use. In particular, original document images are generated in step 704 to create original image dataset 705. In step 706, original images from dataset 705 are randomly sampled to produce target images 710. Noise is then added to target images 710 at step 715 to produce noisy images 716.

A training sequence between the denoiser and discriminator is then performed using noisy images 716 as the source input. In particular, noisy images 716 are passed into the denoiser as shown in step 720 for processing by a denoiser algorithm to generate denoised images 721. A denoised label is also generated in sub-process 722 for denoised images 721. For example, a denoised label is a numerical constant that indicates the "type" of image. The denoised label, in this example, indicates that its corresponding image has passed through the denoiser. At step 725, both the denoised images 721 and the denoised label are passed into the discriminator (e.g., provided as inputs) for processing by a discriminator algorithm. An output of the discriminator algorithm from step 725 is discriminator denoised loss 726, which corresponds to the summation of errors made by the discriminator in the evaluation of the denoised images 721, e.g., with the errors being derived from the difference between the discriminator's prediction and the actual label (denoised label). The discriminator denoised loss 726 is provided for processing by a backpropagation algorithm in step 730 to generate backpropagation updates, e.g., a backward propagation of errors based on a computation of the gradient of the error function of the discriminator corresponding to the evaluation of denoised images 721.

As shown in FIG. 7B, a training sequence is also performed on the discriminator based on the target images 710, which corresponds to the original image dataset 705 as the source input. In this manner, the discriminator is also trained with original images (which can be separate from the training with noisy images in some embodiments). The target images 710 and a target label generated in step 735 associated with target images 710 (as shown in FIG. 7A) are passed to the discriminator (provided as inputs) as shown in step 740. An output of the discriminator algorithm from step 740 is discriminator target loss 741, which corresponds to the summation of errors made by the discriminator in the evaluation of the target images 710. The discriminator target loss 741 is then provided for processing by a backpropagation algorithm in step 745 to generate backpropagation updates, e.g., a backward propagation of errors based on a computation of the gradient of the error function of the discriminator corresponding to evaluation of target images 710. The backpropagation updates from step 730 (FIG. 7A) and step 745 are then used to update the discriminator at step 750. In one embodiment, the summation of errors being derived from the cross entropy loss between the predicted probability and the true probability.

The objective of the aforementioned training sequences is therefore to train the discriminator to differentiate between original images and denoised images (passed through the denoiser) with improved accuracy. The denoiser is also trained according to various embodiments. For example, as shown in FIG. 7B, another training sequence is performed between the denoiser and discriminator using the noisy image dataset 716 (from FIG. 7A) as the source input, but after the discriminator has been updated as a result of performing the preceding training sequences described above. In particular, noisy images 716 (from FIG. 7A) are passed into the denoiser as shown in step 760 for processing by a denoiser algorithm to generate denoised images 761. A denoised label is also generated in sub-process 762 for denoised images 761. At step 765, both the denoised images 761 and the denoised label are passed into the discriminator (e.g., provided as inputs) for processing by a discriminator algorithm. However, as shown by dotted line 751, the discriminator has already been updated from the training sequence(s) performed for the discriminator based on the target images 710 in the steps described above. An output of the discriminator algorithm from step 765 is discriminator denoised loss 766, which again corresponds to the summation of errors made by the discriminator, but in this case for the evaluation of denoised images 761. The discriminator denoised loss 766 is provided for processing by a backpropagation algorithm in step 770 to generate backpropagation updates, e.g., a backward propagation of errors based on a computation of the gradient of the error function of the discriminator corresponding to the evaluation of denoised images 761. The backpropagation updates from step 770 are then used to update the denoiser in step 775.

The training sequences described above are then repeated on an iterative basis as shown by process flow 780 (FIGS. 7A and 7B). As the training repeats in the neural network-based machine learning model, the objective of the iterative process is the reduction of errors in both the discriminator and the denoiser elements. An objective of the aforementioned training sequences is to train the discriminator to better differentiate between original images and denoised images and also train the denoiser to remove noise from images to the point of fooling the discriminator. These objectives are consistent with the main principles of operation of a machine learning system based on a generative adversarial network (GAN), in which the two elements (e.g., two neural network models) compete with each other so that both are trained (learn) as a result.

According to the embodiments shown and described herein, the discriminator is trained and updated using both original images and noisy images that have been denoised. It should be noted that the training sequences using the different source inputs (e.g., original images and noisy versions of those original images) can be done separately according to various embodiments. For example, it is contemplated in some embodiments that a direct comparison (e.g., side-by-side comparison) of an original image and its corresponding noisy version is not necessary. Instead, the source inputs (e.g., original images and noisy versions of those original images) can be provided at different times, e.g., on an unpaired basis, which supports an unconstrained mode. This is meant to be illustrative and not limiting in any manner as other combinations and variations may or may not involve direct or near-direct comparisons of the image datasets.

Figure 8:
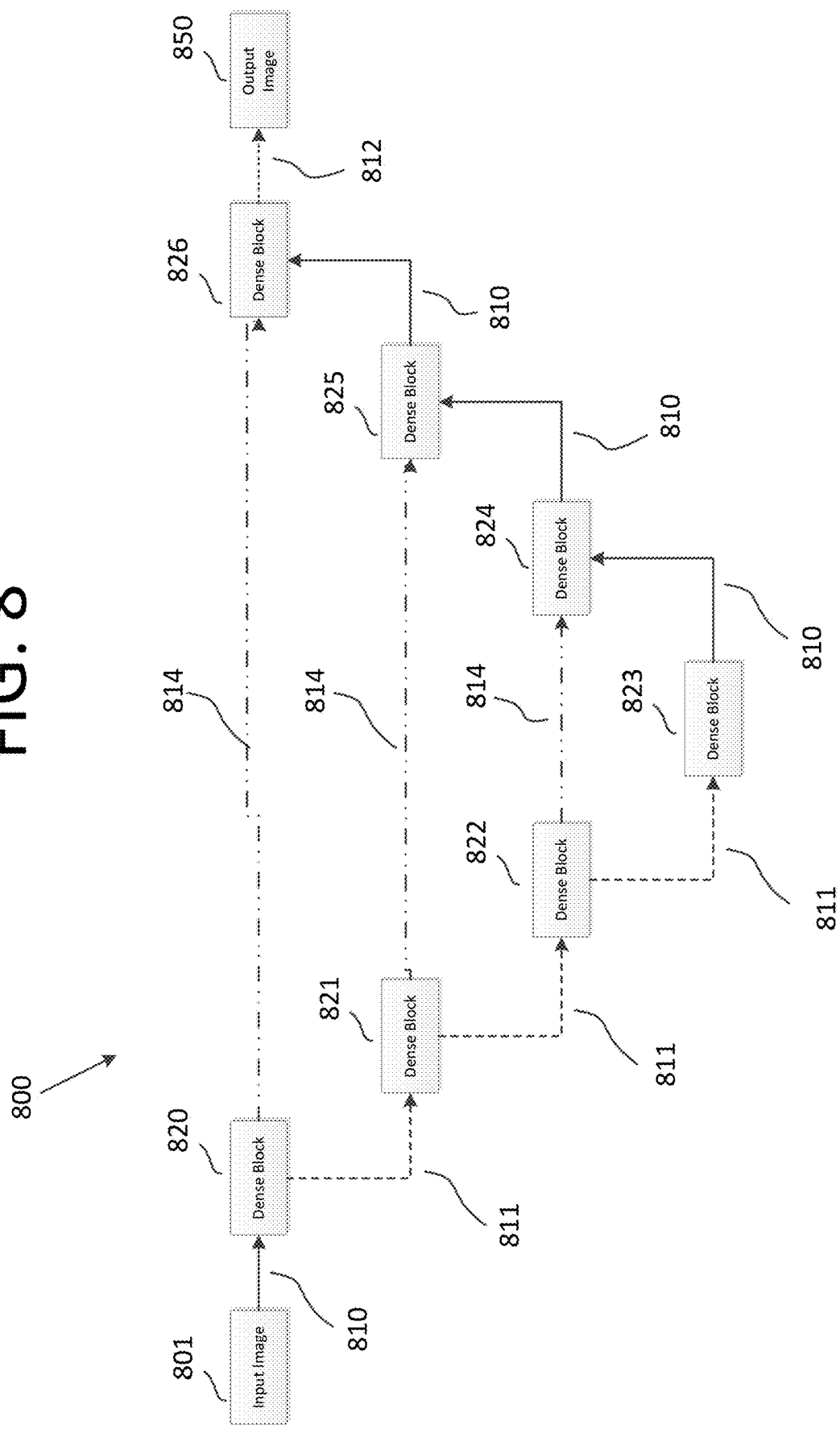
FIG. 8 is a block diagram showing a top-level illustration of a denoising configuration that can be used in the process shown in FIGS. 7A and 7B in accordance with one or more embodiments.

FIG. 8 is a block diagram showing a top-level illustration of a denoiser 800 that can be used in the process shown in FIGS. 7A and 7B in accordance with one or more embodiments. More specifically, it is contemplated that denoiser 800, in one example, can be implemented and/or derived from a U-Shaped variation of the so-called DenseNet architecture, which is a densely connected convolutional network architecture where the output tensor has the same shape as the input tensor. As will be appreciated by those skilled in the art, a U-Shaped DenseNet architecture is implemented with multiple connected Dense Blocks and processing layers for carrying out computational operations on inputs to the denoiser.

As shown in FIG. 8, an input image 801 is provided to a series of concatenated and connected Dense Blocks 820, 821, 822, 823, 824, 825 and 826. An output image 850 is generated as a result of the computational operations performed by Dense Blocks 820-826. Input image 801 is provided as an input to Dense Block 820. Processing is then performed in Dense Block 820 and its output is concatenated (along the channel dimension) to the initial input image and is subsequently provided via downsample connection 811 to Dense Block 821. A channel may refer to image processing conventions, e.g., RGB (3 channels), RGBA (4 channels), and so on. For example, image processing software will typically interpret a 3-channel image by corresponding each of the 3 channels to its respective expected values (e.g., channel 1 to R, channel 2 to G, channel 3 to B). In the examples/embodiments described herein, the additional concatenated channels do not necessarily have to correspond to RGB, but are added in the same dimension (e.g., 10 channels . . . 1000 channels, etc.). These examples are only intended to be illustrative and not limiting in any manner.

Returning to FIG. 8, the downsample connection 811 preserves the number of input channels in the data provided to it. Similarly, operations are performed in Dense Blocks 821 and 822 and provided to Dense Blocks 822 and 823, respectively, via downsample connections 811. The outputs of Dense Blocks 822 and 823 are respectively concatenated along the channel dimension to the outputs of the operations performed in Dense Blocks 821 and 822 (after having been passed through the downsample connections 811). Similarly, operations are performed in Dense Blocks 823 through 826, but in these cases, outputs are provided between Dense Blocks 823-826 via upsample connections 810. The upsample connections 810 reduce the number of output channels from their respective Dense Block. The connections between Dense Blocks at the same processing hierarchy level (e.g., Dense Blocks 820 and 826, Dense Blocks 821 and 825, and Dense Blocks 822 and 824) are regarded as skip connections 814. For example, skip connections take the output of the previous corresponding step at the same hierarchy level and concatenate that output to the result of the Dense Blocks from the level below (e.g., concatenate the output of Dense Block 821 and the output of Dense Block 824 after having been passed through the upsample connection and provide the resulting concatenated output as the input to Dense Block 825). The output image 850 is generated from Dense Block 826 via a hyberbolic tangent (tan h) function 812. Operations within Dense Blocks 820-826 and connections between the elements and processing layers will be apparent to those skilled in the art and will not be described in detail herein for sake of brevity. The above-described embodiments are intended to be illustrative and not limiting in any manner. For example, the embodiments are not limited to implementations (e.g., algorithms, etc.) using Dense Blocks in a DenseNet architecture. Other implementations can be suitably used, e.g., other U-Shaped architectures where the input image is the same resolution as the output image, and so on.

Figure 9:
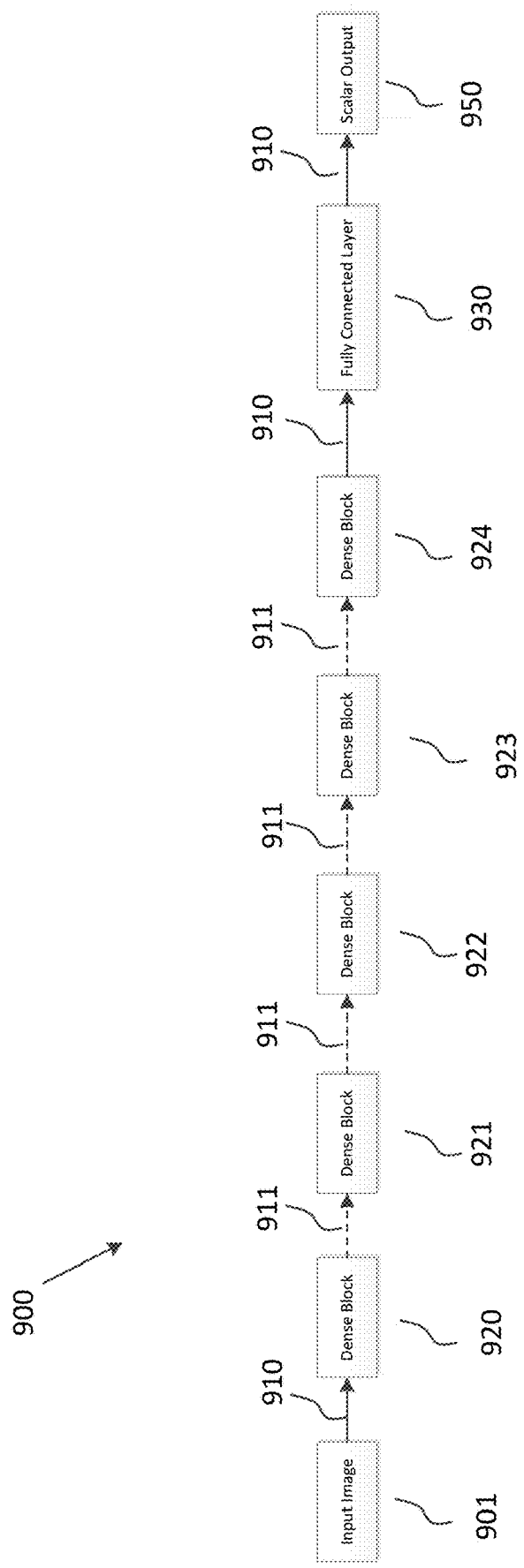
FIG. 9 is a block diagram showing a top-level illustration of a discriminator configuration that can be used in the process shown in FIGS. 7A and 7B in accordance with one or more embodiments.

FIG. 9 is a block diagram showing a top-level illustration of a discriminator 900 that can be used in the process shown in FIGS. 7A and 7B in accordance with one or more embodiments. Similar to denoiser 800 in FIG. 8, discriminator 900 can also be implemented and/or derived from the DenseNet architecture, as shown in this illustrative, but non-limiting embodiment. As previously described, other architectures and implementations may be suitably used where an input image is processed to a scalar output, and so on. As shown, an input image 901 is provided to a series of connected Dense Blocks 920, 921, 922, 923 and 924 where a respective Dense Block's input is concatenated to its output and is then passed as the input to the next Dense Block, and so on. A scalar output 950 is generated through a fully connected layer 930 as a result of the computational operations performed by preceding Dense Blocks 920-924. As shown, input image 901 is provided via downsample connection 910 to Dense Block 920. Processing is then performed in Dense Block 920 and its output (concatenated with its input) is provided via downsample connection 911 to Dense Block 921. Similarly, operations are performed in Dense Blocks 921 through 924 and provided therebetween by downsample connections 911. As with denoiser 800, operations within Dense Blocks 920-924, fully connected layer 930 and the various connections will be apparent to those skilled in the art and will not be described in detail herein for sake of brevity.

Figure 10:
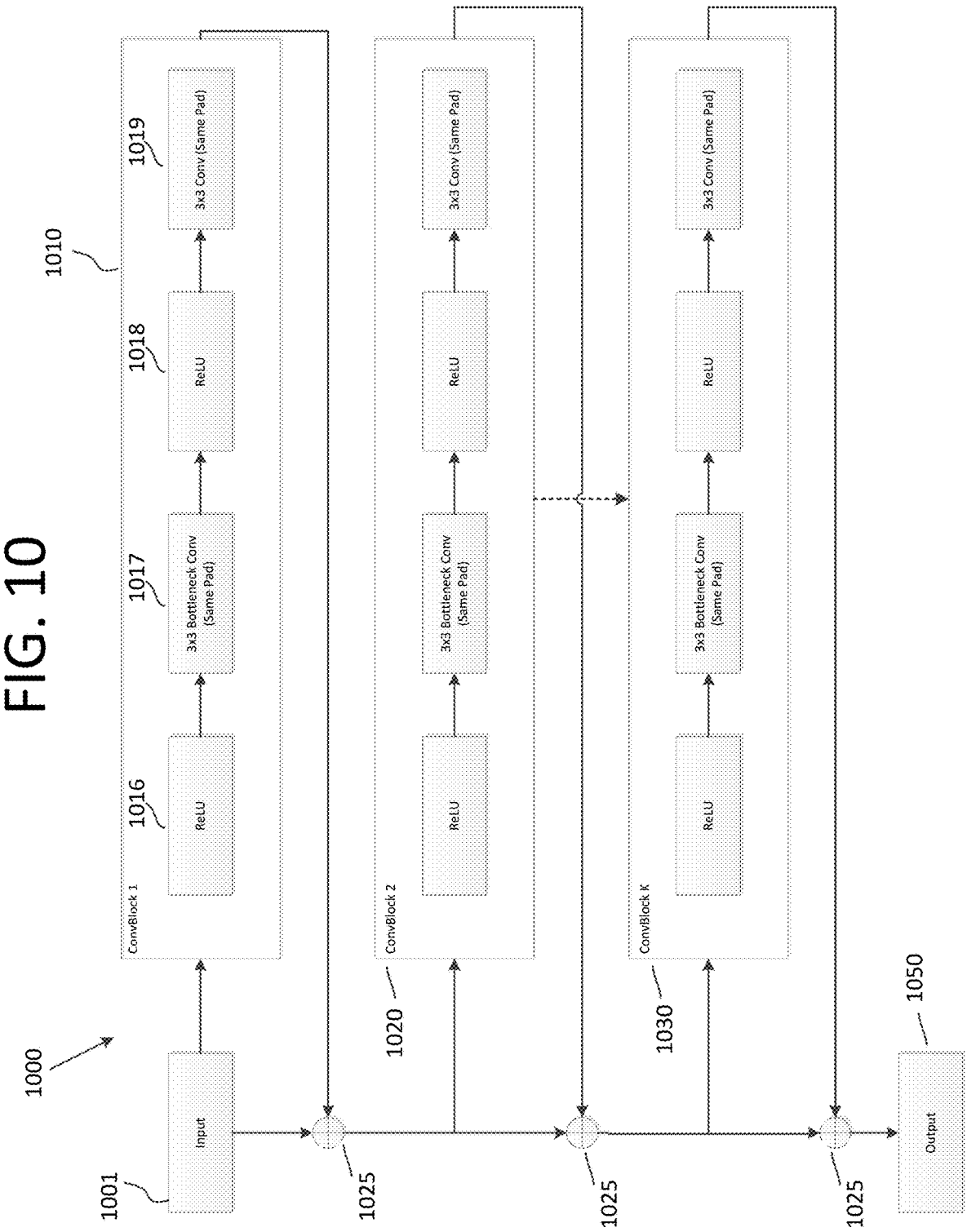
FIG. 10 is a block diagram showing a DenseBlock neural networking configuration that can be used in the denoising configuration (FIG. 8) and the discriminator configuration (FIG. 9) in accordance with one or more embodiments.

FIG. 10 is a simplified block diagram showing a Dense Block configuration 1000 that can be used for Dense Blocks 820-826 in denoiser 800 (FIG. 8) and Dense Blocks 920-924 in discriminator 900 (FIG. 9) in accordance with one or more embodiments. As shown, Dense Block configuration 1000 includes input 1001, output 1050, and a plurality of convolutional blocks 1010, 1020 and 1030 (respectively ConvBlock$_1$, ConvBlock$_2$ . . . ConvBlock$_K$) coupled between input 1001 and output 1050, as shown, with adders 1025. In the exemplary configuration shown in FIG. 10, each ConvBlock is shown to comprise rectified linear unit (ReLU) 1016, 3×3 Bottleneck Cony (same pad) 1017, ReLU 1018 and 3×3 Cony (same pad) 1019. Operations within Dense Block configuration 1000 will be apparent to those skilled in the art and will not be described in detail herein for sake of brevity.

Figure 11:
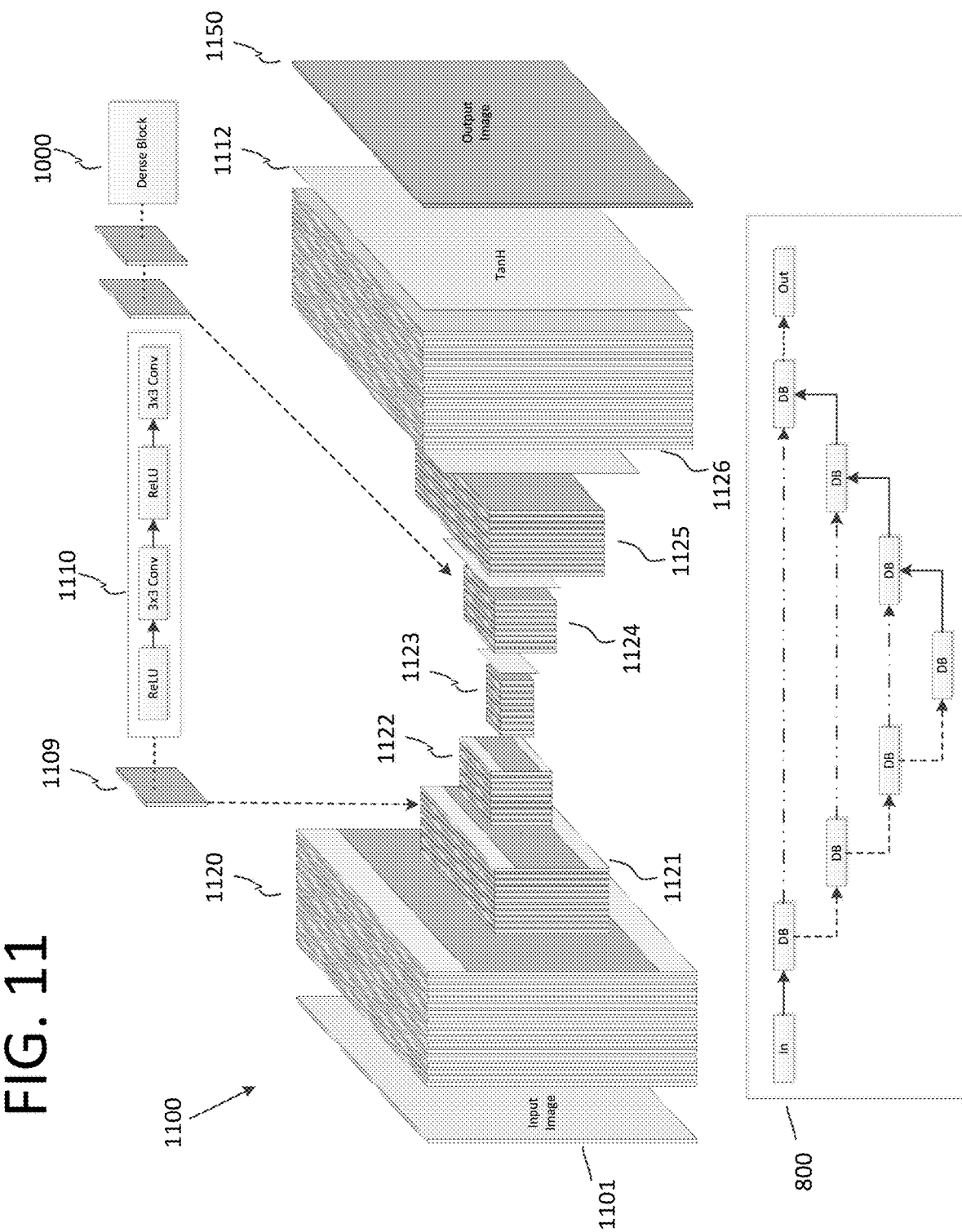
FIG. 11 is a block diagram illustrating various features of the denoising configuration shown in FIG. 8 in accordance with one or more embodiments.

FIG. 11 is a more detailed block diagram illustrating various features of a denoiser 1100 in accordance with an embodiment, and which corresponds to the top-level illustration of denoiser 800 shown in FIG. 8 (which is also shown in a condensed view at the bottom of FIG. 11). In particular, in a corresponding manner to denoiser 800 (FIG. 8), denoiser 1100 includes input image 1101 processed through multiple Dense Blocks 1120, 1121, 1122, 1123, 1124, 1125 and 1126. As also described in the embodiment shown in FIG. 8, skip connections are also implemented in denoiser 1100, e.g., above each of the major downsample connections to connect its corresponding upsample block (same processing hierarchy level). The output image 1150 is generated from Dense Block 1126 via a hyberbolic tangent (tan h) function 1112. A simplified illustration of a representative layer 1109 from Dense Block 1121 (with convolutional block (ConvBlock 1110) as the more detailed view) are also shown to further illustrate a configuration of neural network elements used in denoiser 1100 according to an embodiment. Similarly, a representative Dense Block 1000 (from FIG. 10) is shown for Dense Block element 1124). The operations performed within Dense Blocks 1120-1126 and connections between the various elements and processing layers will be apparent to those skilled in the art and will not be described in detail herein for sake of brevity.

Figure 12:
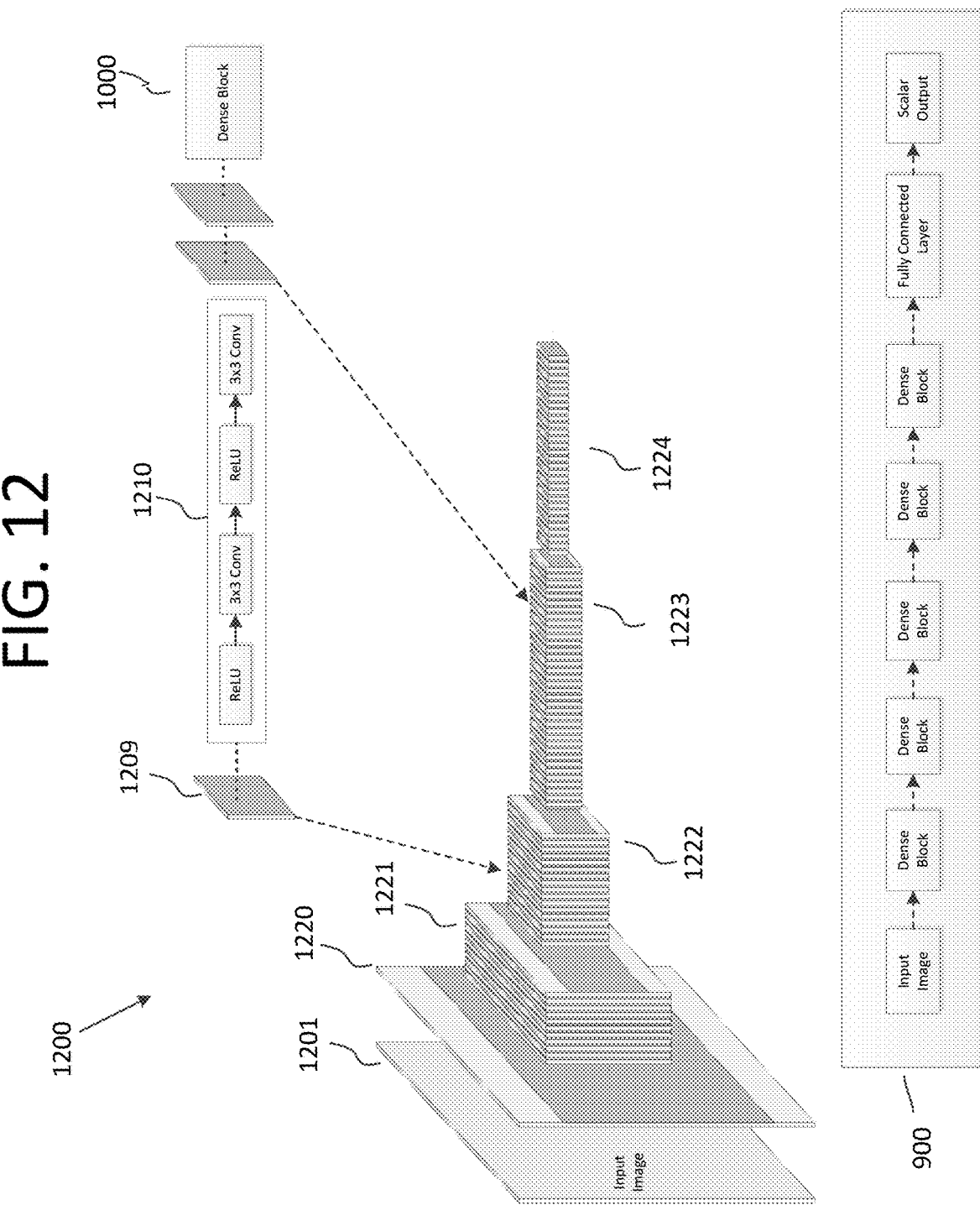
FIG. 12 is a block diagram illustrating various features of the discriminator configuration shown in FIG. 9 in accordance with one or more embodiments.

FIG. 12 is a more detailed block diagram illustrating various features of a discriminator 1200 in accordance with an embodiment, and which corresponds to the top-level illustration of discriminator 900 shown in FIG. 9 (which is also shown in a condensed view at the bottom of FIG. 12). In particular, in a corresponding manner to discriminator 900 (FIG. 9), discriminator 1200 includes input image 1201 processed through multiple Dense Blocks 1220, 1221, 1222, 1223 and 1224. A simplified illustration of a representative layer 1209 from Dense Block 1222 with a convolutional block (ConvBlock 1210) as the more detailed view are also shown to further illustrate a configuration of neural network elements used in discriminator 1200 according to an embodiment. The operations performed within Dense Blocks 1220-1224 and connections between the various elements and processing layers will be apparent to those skilled in the art and will not be described in detail herein for sake of brevity.

In one embodiment contemplated herein, denoising 800 (and 1100) may comprise 60 layers with 3 channels added at each layer. For example, a DenseNet architecture without the U-Shape can be suitably used as an implementation. In this example, there is no downsampling, which ensures that input resolution can be maintained, which may help preserve visual acuity. In this illustrative embodiment, discriminator 900 (and 1200) may comprise, for example, 26 layers with 5 channels added at each layer (e.g., by virtue of concatenation occurring in the Dense Block). Downsampling would take place every 5 layers in this example such that the end-output is 1×1 dimensional with 1 channel value. This example is meant to be illustrative only and not limiting in any manner. Various other implementations are possible, which can be a matter of design choice, and which are contemplated by the teachings herein. In the various embodiments, the denoiser function takes an input image and provides an output image of the same (or substantially the same) resolution, while the discriminator function outputs a scalar representing whether the image is fake or not.

Although embodiments are described herein in the context of using a DenseNet-based neural network model, it will be appreciated by those skilled in the art that other neural network implementations may be adapted for the various embodiments according to the principles described herein. Such examples may include, but are not limited to, feed-forward denoising convolutional neural networks such as DnCNN, U-Net (e.g., which was used originally for image segmentation, but has the property of having the same output size as input size) convolutional neural networks, Residual Neural Networks (ResNet) and their variants, and so on. As such, the exemplary embodiments are meant to be illustrative and not limiting in any manner.

The various embodiments described herein can be embodied in the form of methods and a system for practicing those methods. The disclosed methods may be performed by a combination of hardware, software, firmware, middleware, and computer-readable medium (collectively computer) installed in and/or communicatively connected to a user device. Systems, apparatuses, and methods described herein may be implemented using digital circuitry, or using one or more computers using well-known computer processors, memory units, storage devices, computer software, and other components. Typically, a computer includes a processor for executing instructions and one or more memories for storing instructions and data. A computer may also include, or be coupled to, one or more mass storage devices, such as one or more magnetic disks, internal hard disks and removable disks, magneto-optical disks, optical disks, etc.

Systems, apparatus, and methods described herein may be implemented using computers operating in a client-server relationship. Typically, in such a system, the client computers are located remotely from the server computer and interact via a network. The client-server relationship may be defined and controlled by computer programs running on the respective client and server computers.

Systems, apparatus, and methods described herein may be implemented within a network-based cloud computing system. In such a network-based cloud computing system, a server or another processor that is connected to a network communicates with one or more client computers via a network. A client computer may communicate with the server via a network browser application residing and operating on the client computer, for example. A client computer may store data on the server and access the data via the network. A client computer may transmit requests for data, or requests for online services, to the server via the network. The server may perform requested services and provide data to the client computer(s). The server may also transmit data adapted to cause a client computer to perform a specified function, e.g., to perform a calculation, to display specified data on a screen, etc. For example, the server may transmit a request adapted to cause a client computer to perform one or more of the steps or functions of the methods and workflows described herein, including one or more of the steps or functions described in the above embodiments. Certain steps or functions of the methods and workflows described herein, including one or more of the steps or functions described in the above embodiments, may be performed by a server or by another processor in a network-based cloud-computing system. Certain steps or functions of the methods and workflows described herein, including one or more of the steps described in the above embodiments, may be performed by a client computer in a network-based cloud computing system. The steps or functions of the methods and workflows described herein, including one or more of the steps described in the above embodiments, may be performed by a server and/or by a client computer in a network-based cloud computing system, in any combination.

Systems, apparatus, and methods described herein may be implemented using a computer program product tangibly embodied in an information carrier, e.g., in a non-transitory machine-readable storage device, for execution by a programmable processor; and the method and workflow steps described herein, including one or more of the steps or functions described in the above embodiments, may be implemented using one or more computer programs that are executable by such a processor. A computer program is a set of computer program instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Figure 13:
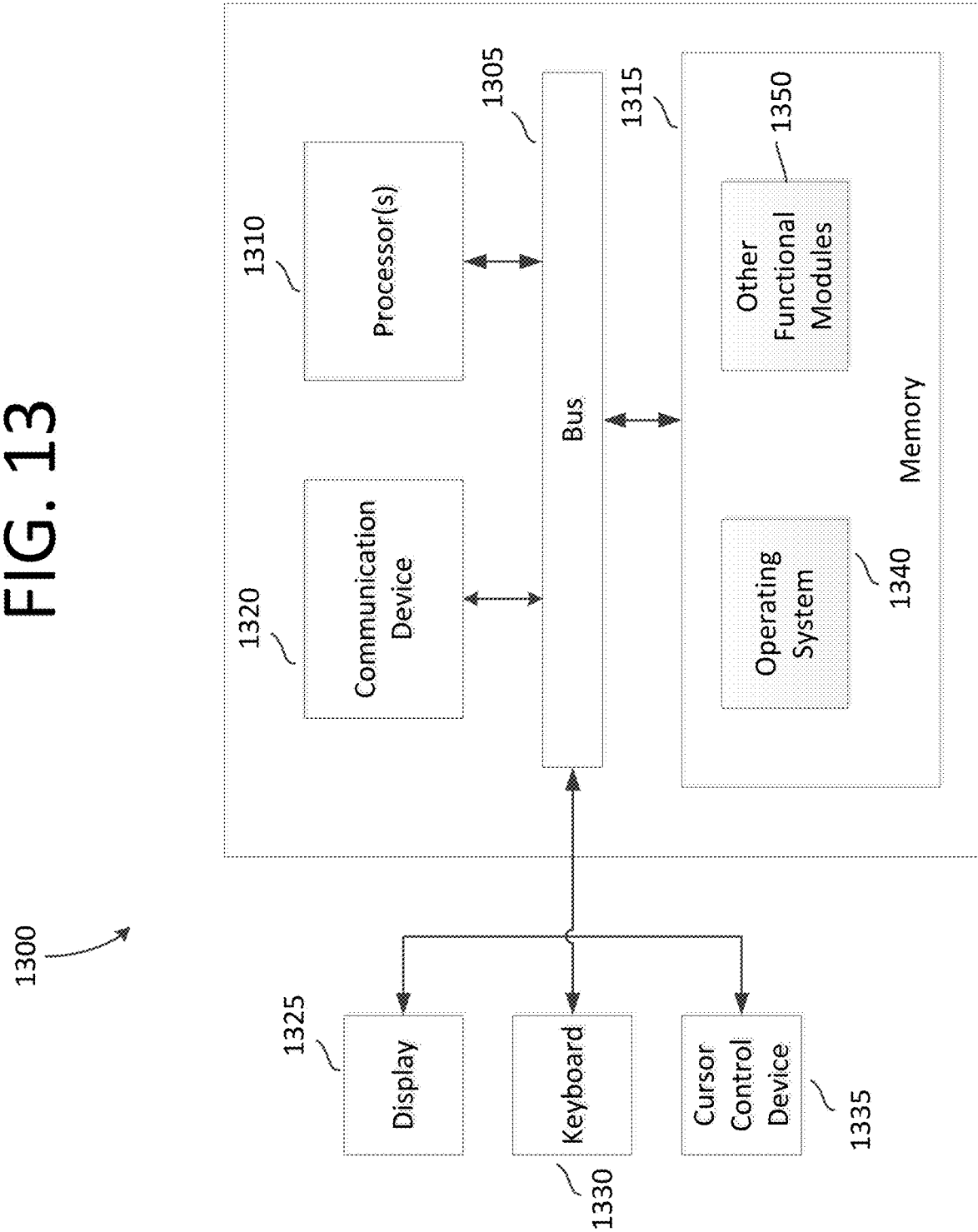
FIG. 13 shows a high-level block diagram of a computing system according to one or more embodiments.

A high-level block diagram of an exemplary computing system 1300 that may be used to implement systems, apparatus, and methods described herein is depicted in FIG. 13. In some embodiments, computing system 1300 may be one or more of the computing systems depicted and/or described herein. Computing system 1300 includes a bus 1305 or other communication mechanism for communicating information, and processor(s) 1310 coupled to bus 1305 for processing information. Processor(s) 1310 may be any type of general or specific purpose processor, including a Central Processing Unit (CPU), an Application Specific Integrated Circuit (ASIC), a Field Programmable Gate Array (FPGA), a Graphics Processing Unit (GPU), multiple instances thereof, and/or any combination thereof. Processor(s) 1310 may also have multiple processing cores, and at least some of the cores may be configured to perform specific functions. Multi-parallel processing may be used in some embodiments.

Computing system 1300 further includes a memory 1315 for storing information and instructions to be executed by processor(s) 1310. Memory 1315 can be comprised of any combination of Random Access Memory (RAM), Read Only Memory (ROM), flash memory, cache, static storage such as a magnetic or optical disk, or any other types of non-transitory computer-readable media or combinations thereof. Non-transitory computer-readable media may be any available media that can be accessed by processor(s) 1310 and may include volatile media, non-volatile media, or both. The media may also be removable, non-removable, or both.

Additionally, computing system 1300 includes a communication device 1320, such as a transceiver, to provide access to a communications network via a wireless and/or wired connection according to any currently existing or future-implemented communications standard and/or protocol.

Processor(s) 1310 are further coupled via bus 1305 to a display 1325 that is suitable for displaying information to a user. Display 1325 may also be configured as a touch display and/or any suitable haptic I/O device.

A keyboard 1330 and a cursor control device 1335, such as a computer mouse, a touchpad, etc., are further coupled to bus 1305 to enable a user to interface with computing system. However, in certain embodiments, a physical keyboard and mouse may not be present, and the user may interact with the device solely through display 1325 and/or a touchpad (not shown). Any type and combination of input devices may be used as a matter of design choice. In certain embodiments, no physical input device and/or display is present. For instance, the user may interact with computing system 1300 remotely via another computing system in communication therewith, or computing system 1300 may operate autonomously.

Memory 1315 stores software modules that provide functionality when executed by processor(s) 1310. The modules may include an operating system 1340 for computing system 1300 and one or more additional functional modules 1350 configured to perform all or part of the processes described herein or derivatives thereof.

It should also be noted that for clarity of explanation, the illustrative embodiments described herein may be presented as comprising individual functional blocks or combinations of functional blocks. The functions these blocks represent may be provided through the use of either dedicated or shared hardware, including, but not limited to, hardware capable of executing software. Illustrative embodiments may comprise digital signal processor (DSP) hardware and/or software performing the operation described herein. Thus, for example, it will be appreciated by those skilled in the art that the block diagrams herein represent conceptual views of illustrative functions, operations and/or circuitry of the principles described in the various embodiments herein. Similarly, it will be appreciated that any flowcharts, flow diagrams, state transition diagrams, pseudo code, program code and the like represent various processes which may be substantially represented in computer readable medium and so executed by a computer, machine or processor, whether or not such computer, machine or processor is explicitly shown. One skilled in the art will recognize that an implementation of an actual computer or computing system may have other structures and may contain other components as well, and that a high level representation of some of the components of such a computer is for illustrative purposes.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

What is claimed is:

1. A method for removing noise from document images, the method comprising:
   receiving one or more scanned paper document images comprising text to be identified using optical character recognition;
   adding random noise to the text of the one or more document images to generate one or more noisy images;
   removing noise from the one or more noisy images via a first neural network-based denoising system to generate one or more denoised images;
   evaluating the one or more denoised images via a second neural network-based discriminator system to generate a predictive output relating to authenticity of the one or more denoised images; and
   using feedback from a first backpropagation update to train the first neural network-based denoising system to denoise document images comprising text to be identified using optical character recognition, wherein the feedback is a propagation of errors based on the gradient of an error function of the discriminator system.

2. The method according to claim 1, further comprising:
   evaluating the one or more document images via the second neural network-based discriminator system to generate a predictive output relating to authenticity of the one or more document images; and
   using feedback from a second backpropagation update to train the second neural network-based discriminator system.

3. The method according to claim 2, further comprising:
   evaluating the one or more denoised images via the second neural network-based discriminator system to generate a predictive output relating to authenticity of the one or more denoised images; and
   using feedback from a third backpropagation update to train the second neural network-based discriminator system.

4. The method according to claim 3, wherein the predictive output relating to authenticity is an indicator of whether the evaluated one or more denoised images is determined as being a synthetically-generated document image corresponding to the one or more noisy images or an original document image corresponding to the one or more document images.

5. The method according to claim 3, wherein the first, second and third backpropagation updates correspond to respective computations of errors by the second neural network-based discriminator system.

6. The method according to claim 5, wherein a plurality of training sequences are iteratively performed to provide the respective first, second and third backpropagation updates.

7. The method according to claim 6, wherein the plurality of training sequences are iteratively performed to facilitate learning, by the second neural network-based discriminator system, of underlying patterns of noise in the one or more noisy images.

8. The method according to claim 3, wherein the second neural network-based discriminator system receives an equal number of the one or more denoised images and the one or more document images, and wherein the one or more denoised images and the one or more document images are provided to the second neural network-based discriminator system on an unpaired basis at different times.

9. The method according to claim 3, wherein the one or more documents images constitute a synthetic dataset comprising original document images.

10. The method according to claim 9, wherein the first neural network-based denoising system and the second neural network-based discriminator system are trained to reach an equilibrium state, whereby the first neural network-based denoising system generates denoised output images such that the predictive output is indicative that the denoised output images are not distinguishable from the original document images.

11. A system for removing noise from document images, the system comprising a processor, for executing computer program instructions stored in a memory, which when executed by the processor, cause the processor to perform operations comprising:
   receiving one or more scanned paper document images comprising text to be identified using optical character recognition;
   adding random noise to the text of the one or more document images to generate one or more noisy images;
   removing noise from the one or more noisy images via a first neural network-based denoising system to generate one or more denoised images;
   evaluating the one or more denoised images via a second neural network-based discriminator system to generate a predictive output relating to authenticity of the one or more denoised images; and
   using feedback from a first backpropagation update to train the first neural network-based denoising system to denoise document images comprising text to be identified using optical character recognition, wherein the feedback is a propagation of errors based on the gradient of an error function of the discriminator system.

12. The system according to claim 11, the operations further comprising:
evaluating the one or more document images via the second neural network-based discriminator system to generate a predictive output relating to authenticity of the one or more document images; and
using feedback from a second backpropagation update to train the second neural network-based discriminator system.

13. The system according to claim 12, the operations further comprising:
evaluating the one or more denoised images via the second neural network-based discriminator system to generate a predictive output relating to authenticity of the one or more denoised images; and
using feedback from a third backpropagation update to train the second neural network-based discriminator system.

14. The system according to claim 11, wherein the predictive output relating to authenticity is an indicator of whether the evaluated one or more denoised images is determined as being a synthetically-generated document image corresponding to the one or more noisy images or an original document image corresponding to the one or more document images.

15. The system according to claim 13, wherein the first, second and third backpropagation updates correspond to respective computations of errors by the second neural network-based discriminator system.

16. The system according to claim 15, wherein a plurality of training sequences are iteratively performed to provide the respective first, second and third backpropagation updates.

17. The system according to claim 16, wherein the plurality of training sequences are iteratively performed to facilitate learning, by the second neural network-based discriminator system, of underlying patterns of noise in the one or more noisy images.

18. The system according to claim 13, wherein the second neural network-based discriminator system receives an equal number of the one or more denoised images and the one or more document images, and wherein the one or more denoised images and the one or more document images are provided to the second neural network-based discriminator system on an unpaired basis at different times.

19. The system according to claim 13, wherein the one or more documents images constitute a synthetic dataset comprising original document images.

20. The system according to claim 19, wherein the first neural network-based denoising system and the second neural network-based discriminator system are trained to reach an equilibrium state, whereby the first neural network-based denoising system generates denoised output images such that the predictive output is indicative that the denoised output images are not distinguishable from the original document images.

* * * * *